(12) United States Patent
Thompson

(10) Patent No.: US 7,646,106 B2
(45) Date of Patent: Jan. 12, 2010

(54) TURBINE ASSEMBLY FOR GENERATING ELECTRICITY IN VEHICLES

(76) Inventor: Frank Thompson, P.O. Box 2291, Nipomo, CA (US) 93444-8861

( * ) Notice: Subject to any disclaimer, the term of this patent is extended or adjusted under 35 U.S.C. 154(b) by 0 days.

(21) Appl. No.: 12/006,772

(22) Filed: Jan. 7, 2008

(65) Prior Publication Data
US 2009/0174189 A1 Jul. 9, 2009

(51) Int. Cl.
*F02C 6/00* (2006.01)

(52) U.S. Cl. .................. 290/52; 290/40 R; 290/40 C

(58) Field of Classification Search ............. 290/52, 290/40, 40 R, 40 C
See application file for complete search history.

(56) References Cited

U.S. PATENT DOCUMENTS

| 4,978,328 | A | | 12/1990 | Pierce | |
|---|---|---|---|---|---|
| 5,856,709 | A | * | 1/1999 | Ibaraki et al. | 290/45 |
| 6,645,017 | B1 | * | 11/2003 | Skrzypek et al. | 440/6 |
| 6,700,215 | B2 | | 3/2004 | Wu | |

* cited by examiner

*Primary Examiner*—T C Patel
*Assistant Examiner*—Iraj A Mohandesi
(74) *Attorney, Agent, or Firm*—Andrew Y. Schroeder

(57) ABSTRACT

A system for generating electricity from the rotational movement of wheels of a vehicle incorporates a turbine assembly, a wheel assembly, and an apparatus for storing electricity. The turbine assembly is disposed within the wheel assembly. The turbine assembly is connected to the apparatus for storing electricity thereby supplying the apparatus for storing electricity with electricity produced by the rotational movement of the wheel. The turbine assembly is comprised of a hollow rotor and a stator. The stator is disposed longitudinally within the hollow rotor.

4 Claims, 2 Drawing Sheets

TURBINE ASSEMBLY FOR GENERATING ELECTRICITY IN VEHICLES

FIELD OF THE INVENTION

The present invention relates with the automobile industry and pertains more particularly to a turbine assembly for use with vehicles.

BACKGROUND OF THE INVENTION

The internal gasoline combustion engine has been the primary apparatus powering most vehicles on the roads for over a century. One of the reasons why gasoline has been the most widely used fuel is because it was a by product in the process of making kerosene, the substance used to fuel lamps. Gasoline is also an inherently energy-rich substance providing explosive bursts of energy as it is mixed with air in the carburetor of an internal combustion engine.

Unfortunately, gasoline has become associated with many inefficiencies and societal issues. For instance, it is well known that only about 25% of the air-fuel mixture is usable energy. Moreover, only a fraction of this usable energy is actually translated into forward propulsion. The remaining energy is lost through heat, noise, and engine friction.

The remaining 75% of the air-fuel mixture is released into the environment as exhaust emissions. Some of the principal exhaust emissions include carbon dioxide, carbon monoxide, nitrogen dioxide, and formaldehyde. These emissions are known to greatly contribute to global warming and other maladies.

To date, most vehicles have not been able to recapture energy loss naturally generated by the vehicle's propulsion. Some vehicles have been able to re-capture energy through the braking systems in hybrid vehicles. However, no vehicles have been able to adequately re-capture and generate energy from an accelerating vehicle.

The most obvious source to re-capture energy from a vehicle is through the axle assembly and/or wheel assembly. Since these assemblies produce much of the power translated from the motor or engine of the vehicle they provide an obvious source for re-capturing and generating electricity.

Therefore, what is clearly needed in the art is a vehicle energy system which is able to generate electricity from the rotational movement of the wheels of a vehicle. This system should enable electric vehicles to move faster, longer, and much more efficiently while producing no greenhouse emissions which contribute to global warming. This system would also provide a cost savings to the owners of those vehicles which are enabled with such systems.

SUMMARY OF THE INVENTION

It is an object of the present invention to generate electricity from the rotational movement of the wheels of a vehicle. The present invention incorporates a turbine mounted to the wheel assembly of a vehicle. As the wheels spin, the hollow rotor spins in turn. The stator which is disposed longitudinally within the hollow rotor generates electricity. The electricity is then routed to an ultracapacitor. In some preferred embodiments the ultracapacitor is an NEU (nanotube-enhanced ultracapacitor).

Another object of the present invention is to provide for an assembly for the purpose of mounting the turbine to the wheel assembly of a vehicle. The mounting assembly consists of a first arm, a second arm and a pivot joint. The two arms are pivotally connected with each other and enable the wheels to turn. One arm is affixed with the body of the vehicle and the other arm is affixed to the turbine.

BRIEF DESCRIPTION OF THE DRAWING FIGURES

DESCRIPTION OF PREFERRED EMBODIMENTS

According to a preferred embodiment of the present invention, a unique system and apparatus are used to generate electricity to be used by the motor of a vehicle. The present invention is described in enabling detail below.

Figure 1:
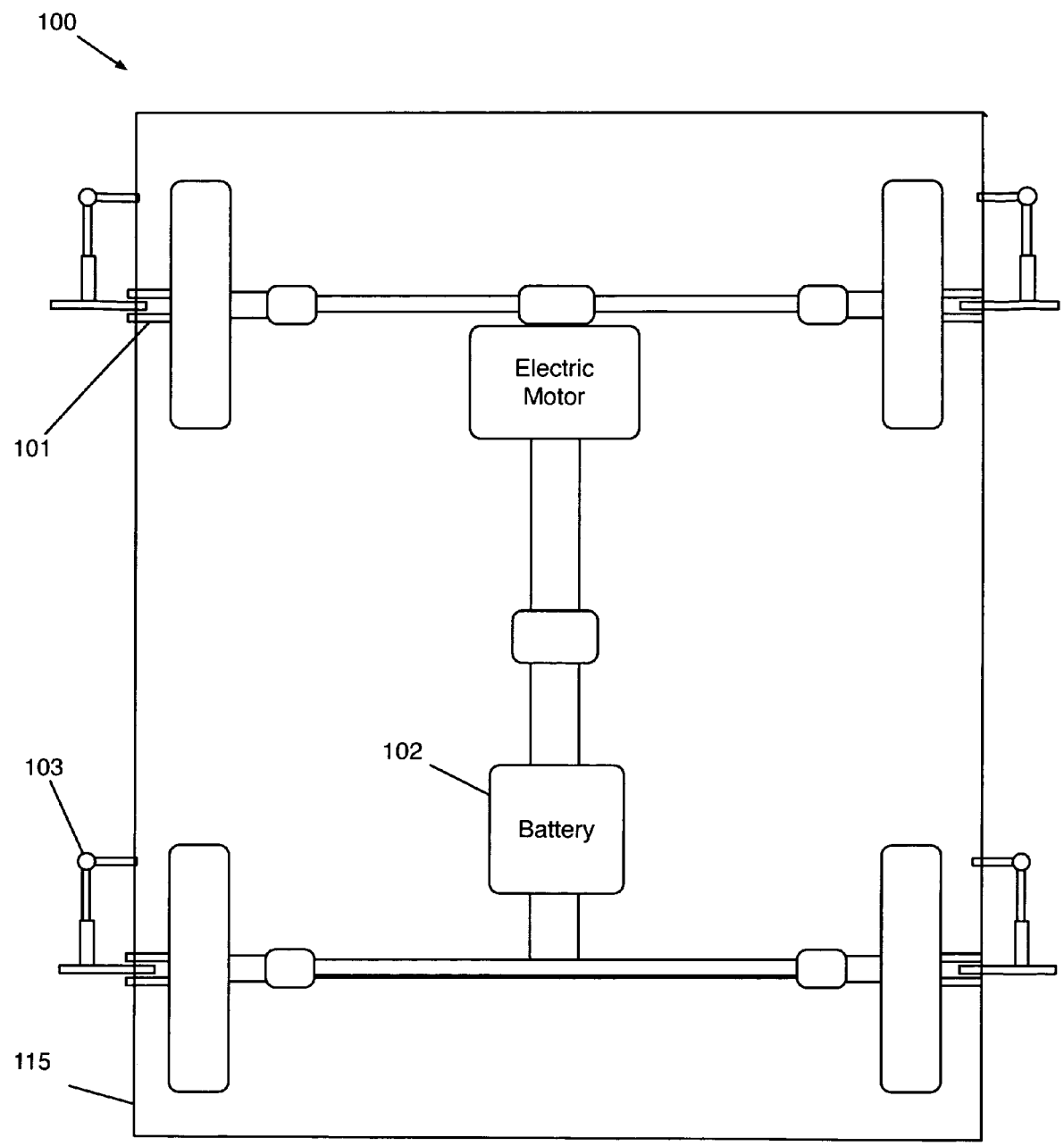
FIG. 1 is a plan view of a preferred embodiment of the present invention.

FIG. 1 illustrates a preferred embodiment of the present invention. A system for generating electricity from the rotational movement of wheels of a vehicle utilizes a wheel generator system 100. In some preferred embodiments the wheel generator incorporates a turbine assembly 101 and an apparatus for storing electricity 102.

The turbine assembly is disposed within the wheel assembly. The turbine assembly is connected to the apparatus for storing electricity. The turbine assembly supplies the apparatus for storing electricity the power produced by the rotational movement of the wheel.

Figure 2:
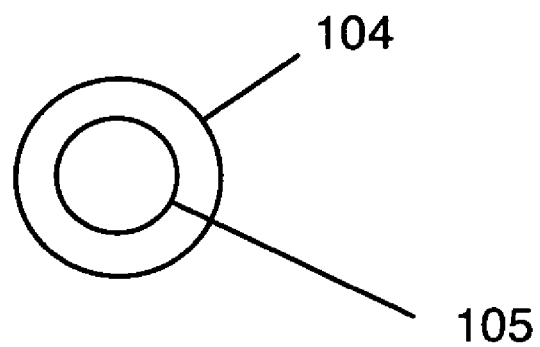
FIG. 2 is a plan view of a preferred embodiment of the present invention.

FIG. 2 illustrates that in some preferred embodiments the turbine assembly is comprised of a hollow rotor 104 and a stator 105. The stator is disposed longitudinally within the hollow rotor. The hollow rotor is affixed to the axle of the vehicle. As the axle rotates the hollow rotor rotates at the same speed. This rotational movement combined with the magnetic field produced by the stator results in electricity.

Figure 3:
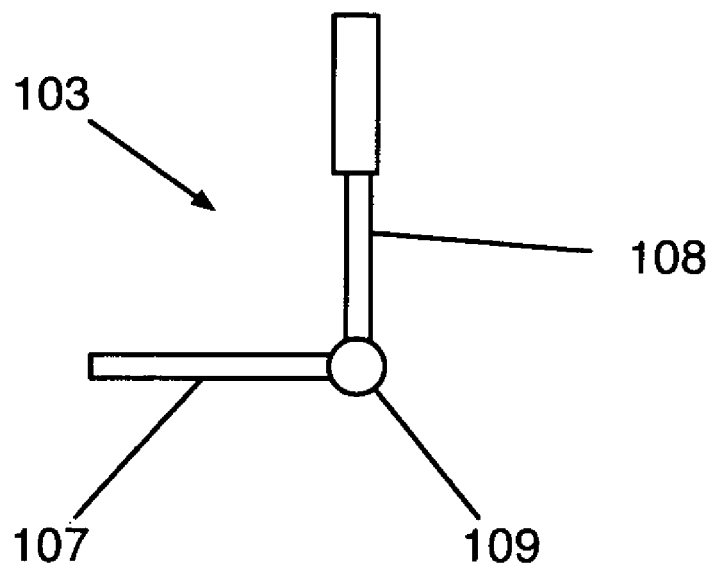
FIG. 3 is a plan view of a preferred embodiment of the present invention.

FIG. 3 illustrates that in some preferred embodiments the wheel generator may further incorporate a turbine assembly bracket 103. The turbine assembly bracket comprises a first arm 107, a second arm 108, and a joint 109. The first arm is pivotally connected to the second arm through the joint. The first arm is affixed to the turbine assembly and the second arm is affixed to the vehicle body 115 as shown in FIG. 4. The turbine assembly bracket is able to move in order to allow for the wheel assembly to turn as the vehicle's front wheels turn.

In some preferred embodiments the apparatus for storing electricity is an ultracapacitor. Moreover, in some preferred embodiments the ultracapacitor may be an NEU (nanotube-enhanced ultracapacitor). NEU's are suitable for the present invention because they are capable of storing large amounts of electricity without the size and weight requirements associated with most batteries. However, in other preferred embodiments the apparatus for storing electricity may be a fuel cell or standard battery.

It will be apparent to the skilled artisan that there are numerous changes that may be made in embodiments described herein without departing from the spirit and scope of the invention. As such, the invention taught herein by specific examples is limited only by the scope of the claims that follow.

What is claimed is:

1. A system for generating electricity from the rotational movement of the wheel assembly of a vehicle comprising: a turbine assembly, a turbine assembly bracket, and an apparatus for storing electricity; the turbine assembly is disposed within the wheel assembly; the turbine assembly is to the apparatus for storing electricity thereby supplying the apparatus for storing electricity with electricity produced by the rotational movement of the wheel; the turbine assembly is comprised of a hollow rotor and a stator; the stator is disposed longitudinally within the hollow rotor;

the turbine assembly bracket comprises a first arm, a second arm, and a joint; the first arm is pivotally connected to the second arm through the joint; the first arm is affixed to the turbine assembly and the second arm is affixed to the vehicle.

2. The system for generating electricity from the rotational movement of the wheel assembly of a vehicle of claim 1 wherein the apparatus for storing electricity is an ultracapacitor.

3. The system for generating electricity from the rotational movement of the wheel assembly of a vehicle of claim 2 wherein the ultracapacitor is an NEU (nanotube-enhanced ultracapacitor).

4. The system for generating electricity from the rotational movement of the wheel assembly of a vehicle of claim 1 wherein the second arm is affixed with the body of a vehicle.

* * * * *